March 7, 1933. H. R. SCHROEDER 1,900,466
INTERNAL COMBUSTION MOTOR
Filed July 19, 1930 2 Sheets-Sheet 1

Inventor
HENRY R. SCHROEDER.
By Clarence A. O'Brien
Attorney

March 7, 1933. H. R. SCHROEDER 1,900,466
INTERNAL COMBUSTION MOTOR
Filed July 19, 1930 2 Sheets-Sheet 2
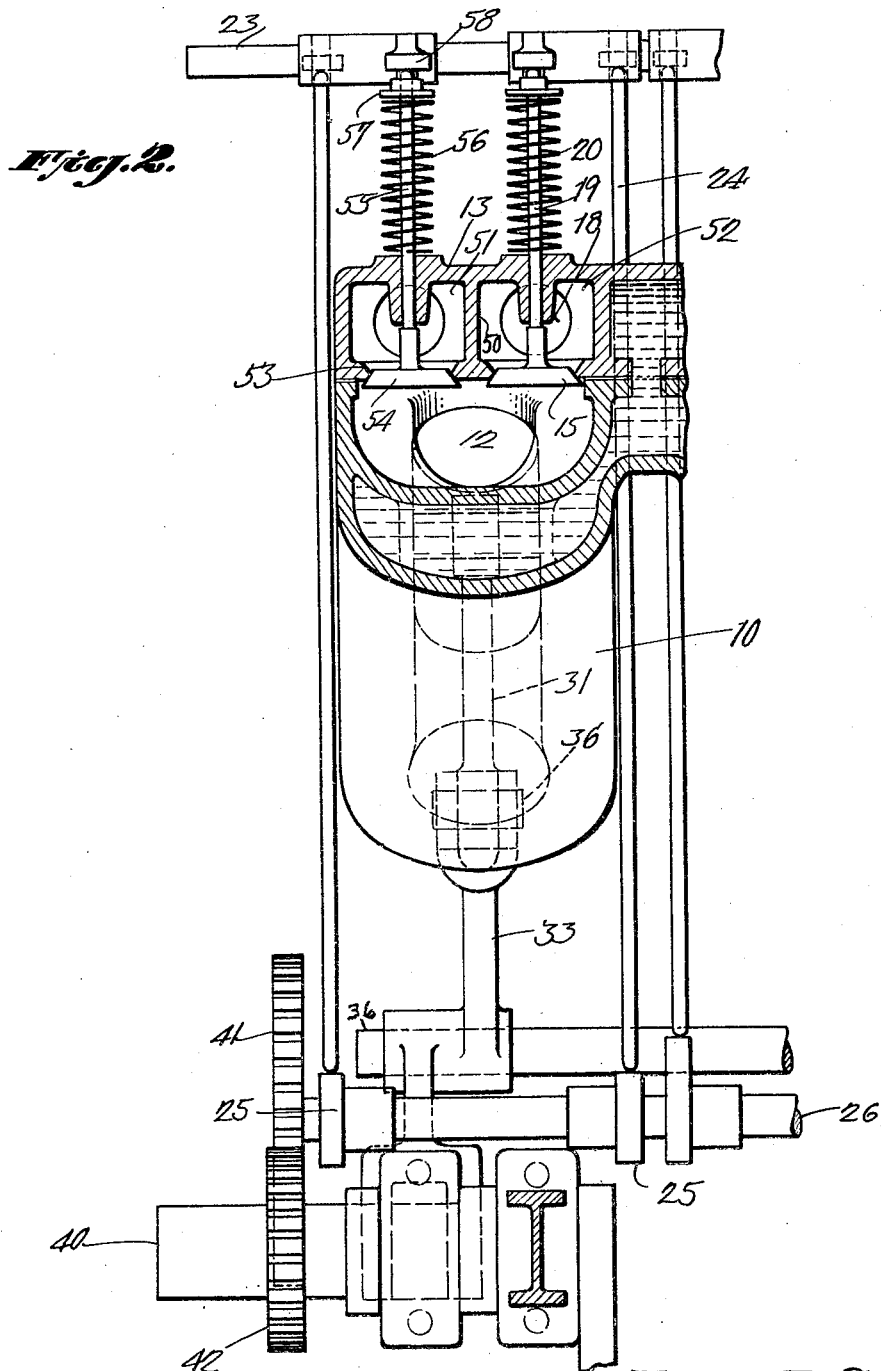
Inventor
HENRY R. SCHROEDER.
By Clarence A. O'Brien
Attorney Patented Mar. 7, 1933

1,900,466

UNITED STATES PATENT OFFICE

HENRY R. SCHROEDER, OF OMAHA, NEBRASKA

INTERNAL COMBUSTION MOTOR

Application filed July 19, 1930. Serial No. 469,240.

This invention relates to internal combustion motors, and more particularly it pertains to a new and novel cylinder construction for multiple cylinder motors of the V-type.

It is one of the objects of the present invention to provide a novel construction in internal combustion motors by means of which relatively high speed, and consequently relatively greater power can be obtained than is possible with the motors as generally constructed.

It is a further object of the invention so to construct a multiple cylinder internal combustion engine that the cylinders are arranged in pairs, with the cylinders in each pair in direct communication to form a common combustion chamber.

It is a further object of the invention so to arrange the cylinders that the combustion chamber resulting from the construction thereof may be supplied with fuel from a single manifold, and may be ignited in said combustion chamber to operate upon the pistons in both of said cylinders by a single spark plug.

A still further object of the invention resides in a novel construction whereby the valves and the spark plugs are located directly in the combustion chamber, thus creating more power than is the case in the type of engines as at present constructed.

It is a further object of the invention so to construct the motor that the cylinders are arranged in inverted V-shape, and at the same time provide for adequate proper lubrication of all of the parts.

With the above and other objects in view, which will appear as the nature of the invention is better understood, reference will now be had to the accompanying drawings, in which;

Figure 2 is a vertical sectional view taken on the line 2—2 of Figure 1.

Figure 1:
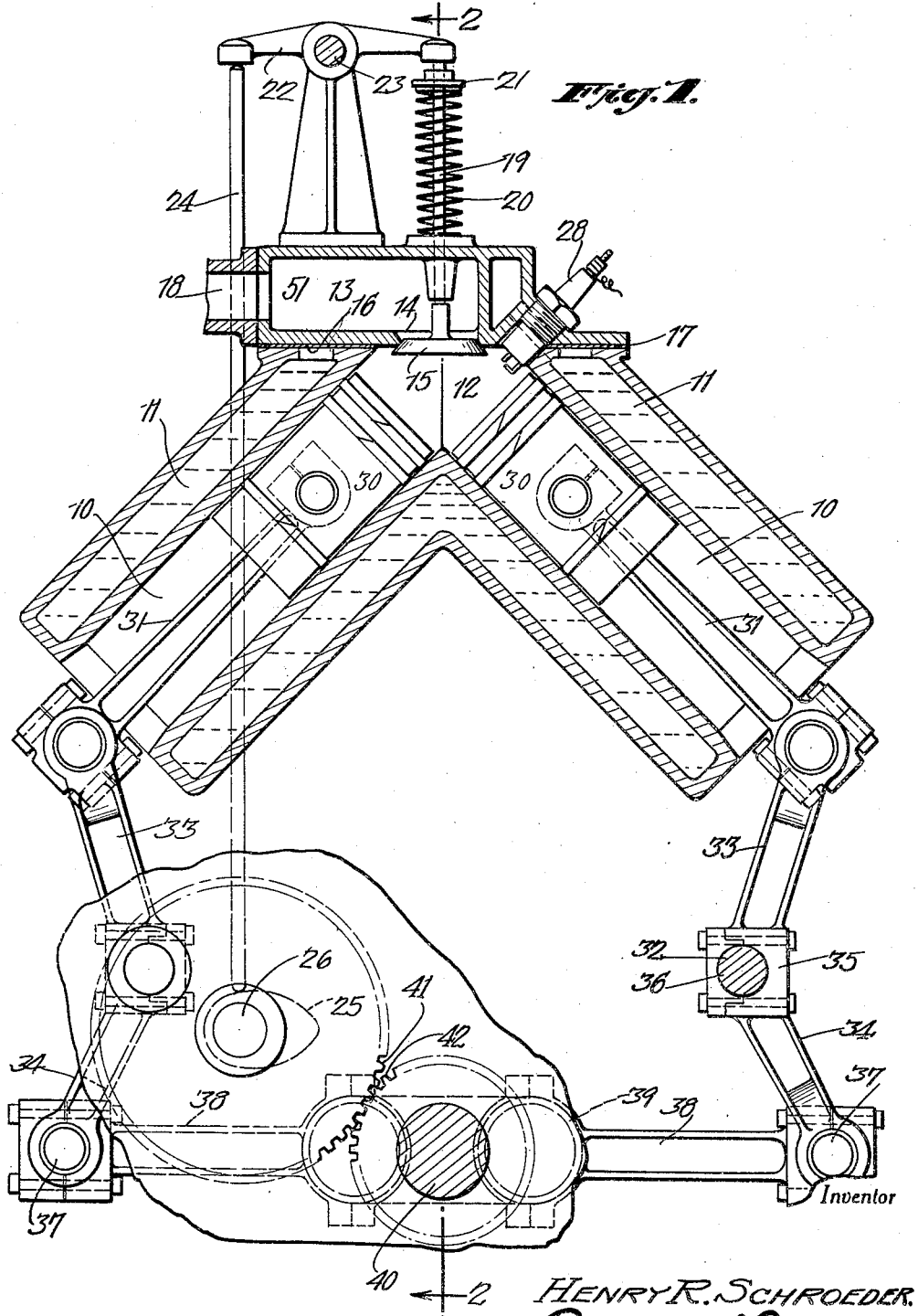
Figure 1 is a vertical sectional view taken transversely of a motor constructed in accordance with the present invention, and showing two of the cylinders of said motor in section.

In the accompanying drawings, the reference character 10 designates the cylinders and these cylinders are water jacketed as at 11. The cylinders of the motor are arranged in pairs, and as illustrated in Figure 1, they are positioned substantially at 45 degree angles to each other, and arranged in inverted V-relation to each other.

It is to be understood that as many pairs of cylinders as are illustrated in Figure 1 may be employed without departing from the spirit of the invention, and that the several principles of operation, and of the construction by which they are attained are applicable to motors including any number of pairs of cylinders. In view of the foregoing, it is only necessary to describe one pair of cylinders, and therefore the present description of the motor will be restricted to but one pair of cylinders.

As more clearly illustrated in Figure 1, the upper ends of the cylinders 10 are in direct communication with each other, to provide a combustion chamber 12. The upper wall of the combustion chamber 12 is formed by an intake manifold 13 which is of hollow construction, and that wall which provides the upper wall of the combustion chamber 12 is provided with an opening 14 adapted to be closed by a valve 15. The upper portion of the cylinders 10 is formed with a seat designated 16, and the intake manifold 13 is adapted to be secured in any desired manner to said seat, a gasket preferably being interposed as designated by the reference character 17. Fuel is supplied to the intake manifold 13 by a suitable supply pipe 18 connected with a carbureter or other charge forming device not shown.

The valve 15 has a valve stem 19, and surrounding said valve stem there is a spring 20 which is compressed between the top wall of the manifold 13 and a suitable washer or the like 21 carried by the valve stem 19. A rocker arm 22 is pivotally mounted as at 23 for operation of the valve against the spring 20, and said rocker arm 22 is actuated by means of a tappet rod or the like 24 which in turn is operated by a cam 25 carried by the cam shaft 26.

From the foregoing description, it will be apparent that as the cam 25 elevates the tappet rod 24, the valve 15 through the medium of the valve rod 19 and the rocked arm 22 will be opened to admit a combustible charge from the intake manifold 13 to the combustion chamber 12. Upon compression of this charge which is accomplished in a manner to be hereinafter described, the charge is fired by a suitable igniting device such as a spark plug designated 28.

Mounted in each of the cylinders 10, there is a piston 30 and each of these pistons 30 carries a connecting rod 31. Connected to the outer end of each connecting rod 31, there is a crank 33 the arms 33 and 34 of which are angularly disposed with respect to each other. Intermediate the ends of these cranks, there is a bearing such as 35, and these bearings are adapted for engagement or mounting upon a shaft 36 which extends longitudinally of each side of the motor. The lower arm 34 of each of the cranks is connected as at 37 to a driving link or the like 38 and said driving links 38 are connected to cranks 39 of a crank-shaft 40 which also extends longitudinally of the motor, and is preferably positioned centrally below the cylinders 10 as best indicated in Figure 1.

The cam shaft 26 heretofore mentioned carries a gear 41 and said gear 41 meshes with a gear 42 carried by the crank-shaft 40. By this means as the gear 42 is rotated by the crank-shaft 40, through the medium of the gear 41 the cam shaft 26 will be rotated to move the several cams 25 beneath their respective tappet rods 24 to operate their respective valves in the heretofore described manner. It is to be understood that the relative size of the gears 41 and 42 may be varied and that their size and relation to each other depend entirely upon the cycle of operation desired in the motor, and therefore, that the invention is not to be limited to the specific relative sizes of the gears 41 and 42 herein illustrated.

By reference to Figure 2 it will be noted that the manifold 13 is divided by a partition 50, which construction provides two chambers 51 and 52. In the present description, the chamber 52 has been described as the intake chamber and consequently, the chamber 51 would constitute the exhaust chamber through which the products of combustion pass after the charge has been fired within the cylinders. This chamber 51 is formed with a valve seat 53 which is adapted for the passage of the products of combustion therethrough to the chamber 51, and this passage of products of combustion is controlled by a valve 54 which has a valve stem 55 surrounded by a coiled spring 56 which in turn is maintained under compression between the top wall of the manifold 13 and a washer 57 carried by the valve stem 55. This valve stem is operated by a rocker arm 58 in a manner similar to that described for the operation of the rocker arm 22, and therefore needs no further description. It is to be understood however that while the chamber 52 has been described as the intake chamber, and the chamber 51 as the exhaust chamber, these chambers may be reversed in operation, and by a slight rearrangement of the cam shaft, the chamber 51 could be employed as the intake chamber and the chamber 52 as the exhaust chamber without departing from the spirit of the invention.

The operation of the device is as follows:

In Figure 1, the position of the several parts is that which prevails when a charge has been placed under compression in the combustion chamber 12 and is about to be fired. Upon firing of the charge in the combustion chamber 12, the expansion of the gases therein moves the pistons 30 downwardly in the cylinders, and through the medium of the several crank connections heretofore described transmits power to the cam shaft 40 driving the same in a rotary direction. After the pistons have reached the limit of the outward stroke, and start inwardly again, the exhaust valve is opened, and the products of combustion are forced from the cylinder through the exhaust chamber 51. As the pistons again assume the position in which they are shown in Figure 1, the intake valve 15 opens and upon the next outward stroke of the pistons 30, both cylinders 31 are sucked full of the combustible charge. After the pistons have reached their outermost position, and again start inwardly, the charge taken into the cylinders is compressed by the inward movement of the pistons and, due to the fact that the two pistons move toward each other greater compression of the gasses is had than can be obtained between a piston and a dead end wall of a cylinder, such as is the common construction of internal combustion motors. It is to be understood that during this operation, immediately the pistons reach the limit of their outer stroke, the intake valve 15 will close to permit of compression of the gasses in the combustion chamber 12. At the proper moment, the charge is fired and the cycle of operation just described is repeated. It will of course be understood that this cycle of operation is carried out in each pair of cylinders which constitute the motor, and that there may as heretofore stated be any desired number of pairs depending entirely upon the power of which it is desired to develop by the motor.

From the foregoing, it will be apparent that the present invention provides an internal combustion motor, in which, owing to the construction of the cylinders, greater compression can be obtained than in motors of general construction. Furthermore it is obvious that by reason of this fact that greater compression can be obtained, a motor constructed in accordance with the present invention will be highly efficient in the generation of power.

While the invention has been herein described in what may be termed a preferred form, it is obvious that the invention is not to be limited to the specific construction herein illustrated, but may be practiced in other forms which rightfully fall within the scope of the appended claim without departing from the spirit thereof.

Having thus described the invention, what is claimed as new and what it is desired to secure by Letters Patent of the United States, is:

In an internal combustion motor, a plurality of cylinders arranged in communicating pairs in inverted V-relation, means for supplying fuel to said cylinders, a piston in each cylinder, a crank shaft, a connecting rod pivoted to each piston, a shaft extending lengthwise of the motor on each side thereof below said cylinders and arranged parallel with the crank shaft, a crank for each cylinder mounted on its respective shaft and having a pair of arms disposed angularly with respect to each other, one of said arms being connected to said connecting rod, and a driving link connecting the other arm of each of said cranks with said crank shaft.

In testimony whereof I affix my signature.

HENRY R. SCHROEDER.